United States Patent Office 3,478,601
Patented Nov. 18, 1969

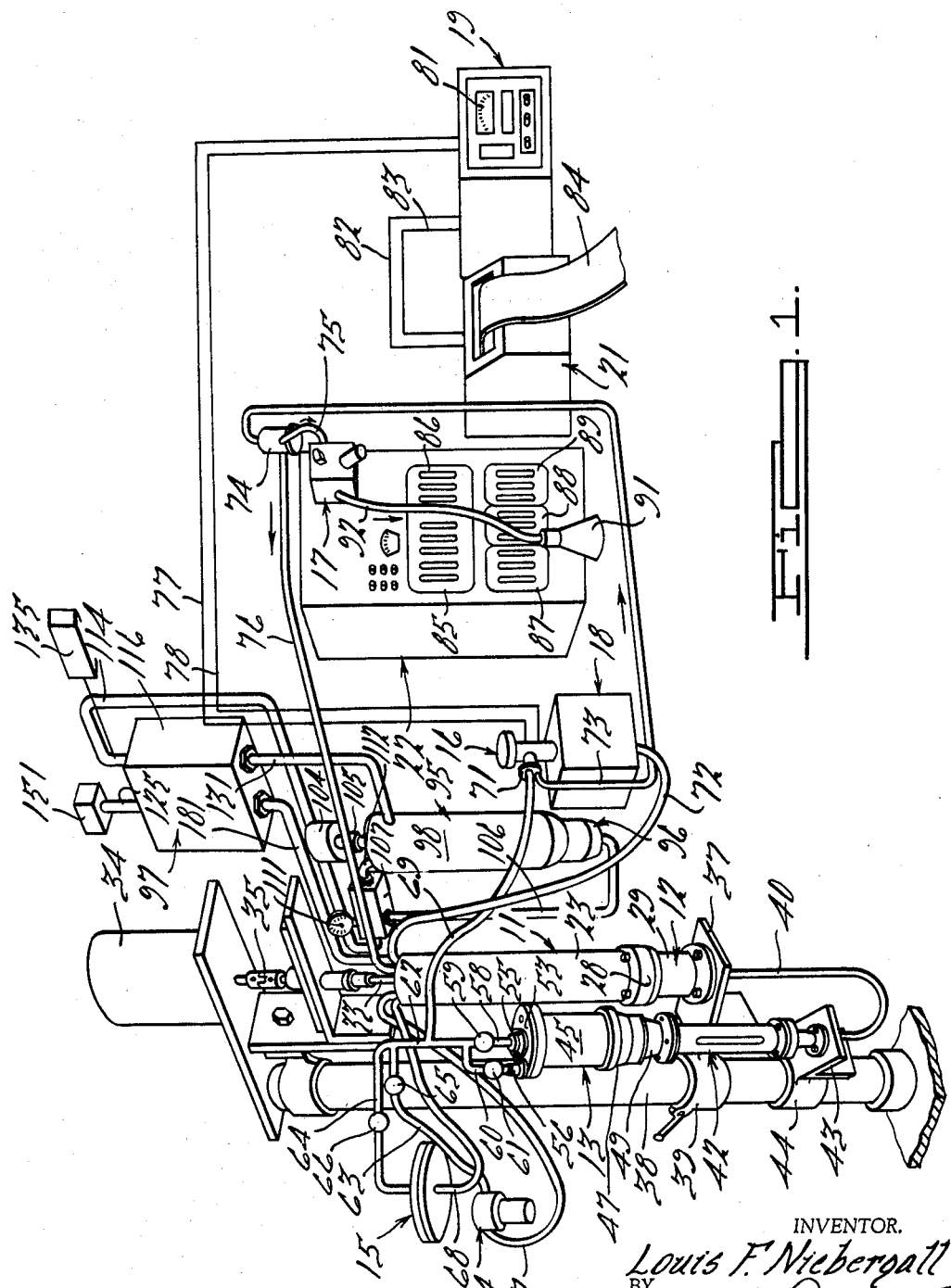

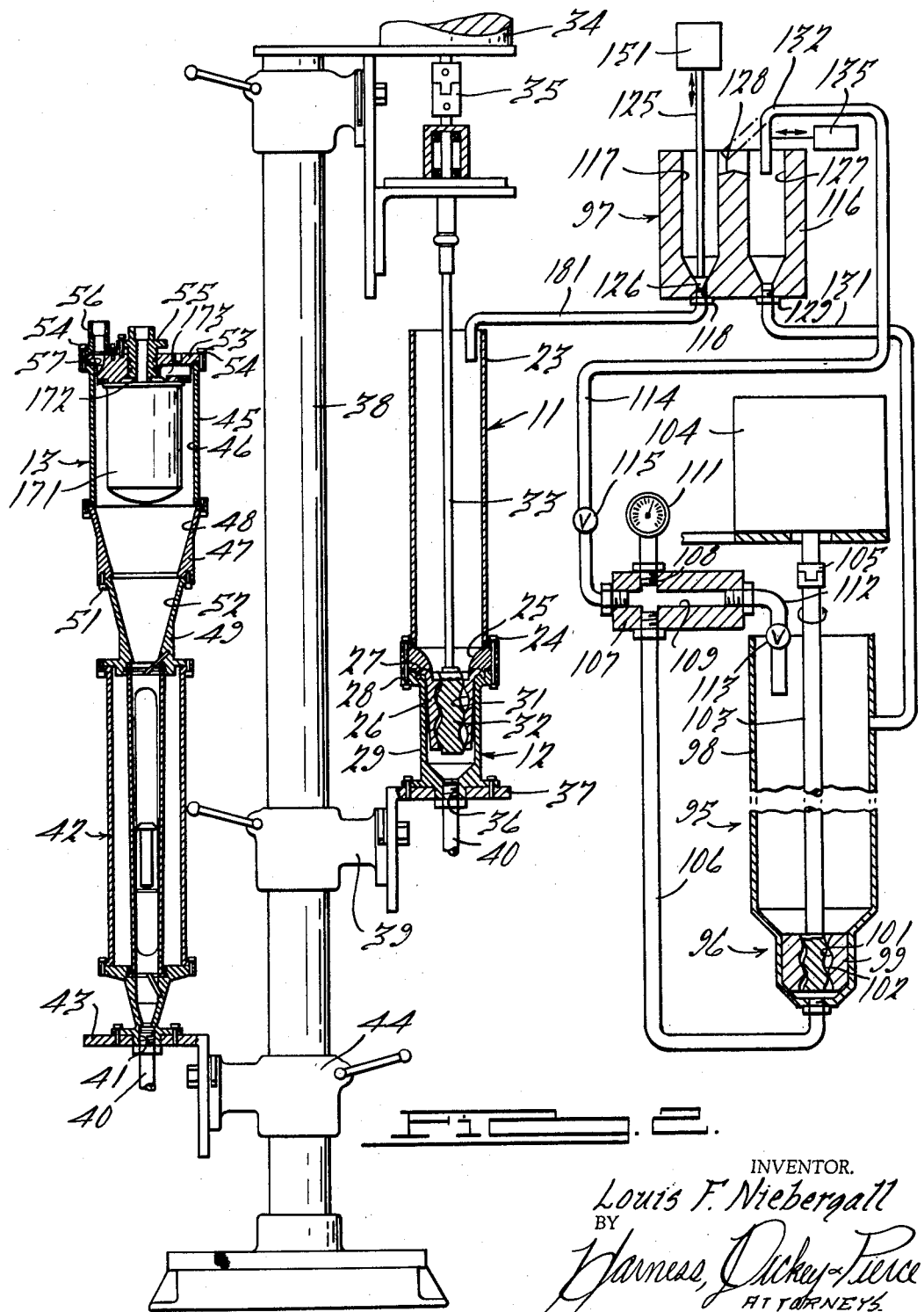

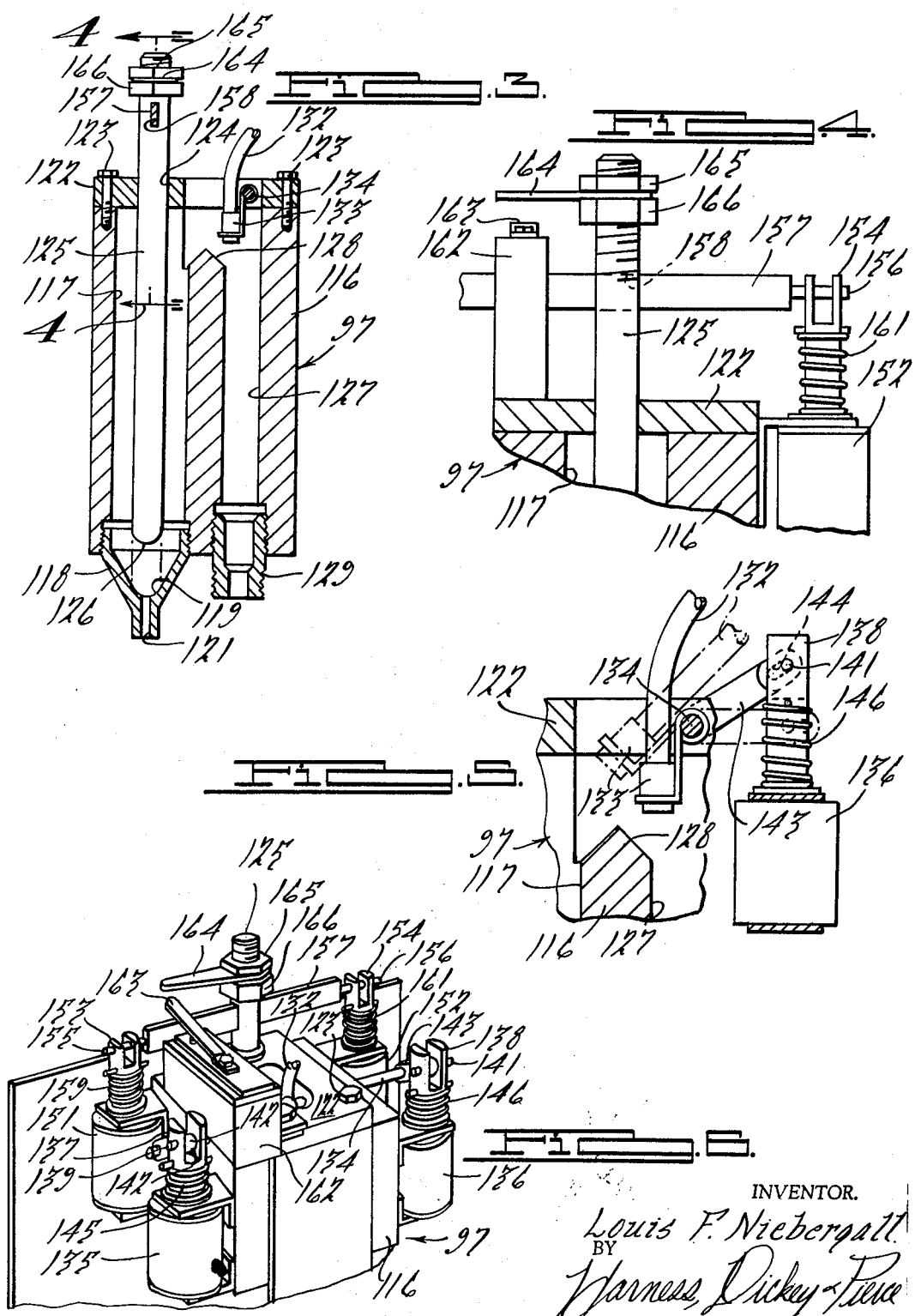

3,478,601
FILTER TEST APPARATUS
Louis F. Niebergall, Racine, Wis., assignor to Walker Manufacturing Company, Racine, Wis., a corporation of Delaware
Continuation-in-part of application Ser. No. 704,074, Feb. 8, 1968. This application July 26, 1968, Ser. No. 747,964
Int. Cl. G01f *15/14;* G01j *5/04*
U.S. Cl. 73—432     7 Claims

ABSTRACT OF THE DISCLOSURE

An apparatus and method for evaluating the efficiency of a filter and the size of foreign particles removed from a fluid by a fluid filter as well as the anticipated filter life. The apparatus includes a test housing having a specially formed cavity in which the filter to be tested is positioned and wherein a test fluid is directed through the filter. The special shape of the cavity precludes the settling out of foreign particles from the test fluid to insure against false efficiency readings. After the test fluid has passed through the fluid filter a sensing apparatus determines both the size of the particles remaining in the test fluid and the number of such particles. By continuously recirculating the test fluid through the filter being tested and through the sensing apparatus, instantaneous readings of the filter efficiency and the size of particles removed from the test fluid may be determined. An apparatus is also embodied for adding predetermined quantities of contaminants to the test apparatus at selected intervals during the test for determining filter life under conditions which closely approximate those encountered in actual use.

BACKGROUND OF THE INVENTION

This application is a continuation-in-part of my copending application, entitled "Filter Evaluation Unit," Ser. No. 704,074, filed Feb. 8, 1968, and assigned to the assignee of this application.

This invention relates to a filter evaluation apparatus and a method of evaluating a filter. More particularly, the invention relates to an improved test method and apparatus for evaluating fluid filters to determine their efficiency and the capability of the filter to exclude particles of different sizes as well as their expected life.

Several methods and associated apparatuses have been employed for testing fluid filters, such as the oil filters used in conjunction with the lubrication system of an internal combustion engine. In order to provide an accurate comparison between different filters, certain standardized tests also are specified by either the filter manufacturers or the ultimate purchaser of the filters. For the most part, the previously proposed methods and apparatuses for commercially testing such fluid filters have operated on a principal wherein the alleged efficiency of the filter is determined by the weight of the foreign particles removed from a test fluid by the filter being tested. That is, in most of these test methods a given weight of foreign particles is added initially to a test fluid. The test fluid and the entrained foreign particles are then passed through the filter to be tested for a given period of time with a given flow rate. At the end of the duration of the test cycle, the test fluid and remaining entrained foreign particles are passed through an extremely fine filter such as a membrane filter which filter has previously been weighed. The membrane filter is intended to remove all of the remaining foreign particles from the test fluid and after the test fluid has all been passed through this filter the filter is dried and again weighed. The additional weight which the membrane filter has gained is assumed to be the weight of the remaining foreign particles in the test fluid. This weight is subtracted from the initial weight of the foreign particles added to the test fluid and is divided by the initial weight to give a percentage which is considered to be the efficiency of the filter tested.

The aforenoted type of test procedure has several defects. For example, it affords no indication as to the specific size or number of different size particles removed if the foreign particles are not of a uniform size. Since in actual use a filter is normally called upon to filter a flow that contains various size foreign particles and to remove these particles from the fluid, the aforenoted test procedure does not afford an accurate indication of the performance a filter will give in actual use. In one of the standardized tests previously referred to, foreign particles of varying sizes are added to the test fluid. Although this mixture of foreign particles is intended to approximate those encountered in actual filter usage, the use of this mixture of particles in the test procedure still may not give an accurate comparison of different type filters since only a weight comparison is made.

In addition to the aforenoted defects, the test procedures previously employed do not lend themselves to an instantaneous indication of filter efficiency nor do they lend themselves to the plotting of an efficiency versus time use curve without resorting to an averaging procedure. Furthermore, the overall reliability of such test procedures may be subject to question.

The aforenoted, previously employed test procedures also do not give completely accurate indications of filter performance in actual use for another reason. In these test procedures, as has been noted, a given quantity of foreign particles are initially added to the test fluid. In actual operation, however, the contaminant level may not be as high at a given period of time as the quantity initially charged into the test apparatus. However, contaminants are continually added to the fluid being filtered during actual operation. In order to approximate these actual conditions, a test procedure has previously been proposed wherein a predetermined amount of contaminants are added periodically on an almost continual basis to the test fluid during the test. With such a procedure, however, the overall efficiency is still determined on a weight measure basis and the efficiency is only determined with this previous test method at the end of the test cycle. Therefore, this previously proposed test procedure does not permit a meaningful or accurate indication of the filter media's efficiency at selected time intervals during the test nor will it indicate time changes in efficiency which take place during the test.

It is, therefore, the principal object of this invention to provide an improved method and apparatus for testing fluid filters.

It is another object of the invention to provide a test method and apparatus wherein both the size and number of foreign particles removed from a test fluid by a filter may be accurately determined.

It is a further object of this invention to provide a test method and apparatus wherein filter efficiency may be determined with extreme accuracy.

It is yet another object of this invention to provide a filter test method and apparatus that permits accurate comparisons to be made between filters of different types.

It is a still further object of this invention to provide a test method and apparatus that more closely approximates actual filter conditions.

It is an even further object of this invention to provide a test method and apparatus whereby predetermined quantities of foreign particles are added to the test fluid at selected time intervals.

It is another object of the invention to provide a filter test method and apparatus which approximates actual filter conditions and which permits a plotting of the filter's efficiency at any selected times during the test or on a continuous basis.

BRIEF SUMMARY OF THE INVENTION

A method embodying this invention is particularly adapted for testing the efficiency and life of a fluid filter under conditions closely approximating those encountered during actual use. In this method a test fluid containing foreign particles is passed continuously through a filter to be tested. The amount of foreign particles removed from the test fluid by the filter are periodically determined. Recirculation of the test fluid and entrained foreign particles is continued through the filter for a given time period and predetermined quantities of foreign particles are added to the test fluid at preselected times during the test cycle.

A test apparatus embodying this invention is particularly adapted to perform the aforenoted method and is also adapted to provide an accurate approximation of filter life under actual conditions. Such an apparatus includes a reservoir for containing the test fluid and entrained foreign particles and means for continuously circulating the test fluid and entrained foreign particles through the filter to be tested. Sensing means are provided for determining the number of foreign particles present in the test fluid to determine the number of such particles removed by the filter. Means are additionally provided for selectively adding a predetermined amount of foreign particles to the reservoir at preselected time intervals.

BRIEF DESCRIPTION OF THE DRAWINGS

FIGURE 1 is a perspective, partially schematic view of a test apparatus embodying this invention and adapted to perform a test method embodying the invention.

FIGURE 2 is an enlarged, partially schematic view, with portions shown in section of the test apparatus of FIGURE 1.

FIGURE 3 is an enlarged cross-sectional view of the contaminant feed head embodied in the apparatus of FIGURES 1 and 2.

FIGURE 4 is an enlarged cross-sectional view taken along the line 4—4 of FIGURE 3.

FIGURE 5 is an enlarged view of the filling device incorporated in the contaminant feed head.

FIGURE 6 is a perspective view of a portion of the contaminant feed head.

DETAILED DESCRIPTION OF THE PREFERRED EMBODIMENTS

The test apparatus is illustrated in part schematically in FIGURE 1 and includes a reservoir or sump 11 to which the test fluid and foreign particles are added in a manner that will become more apparent as this description proceeds. A pump 12 is positioned at the lower end of the reservoir 11 for conveying the test fluid and entrained foreign particles to a filter that is contained within a filter test housing 13. From the filter test housing 13, the fluid under the pressure of the pump 12 may be passed to cleanup filters 14 and/or 15. In addition, the fluid that has passed through the filter test housing 13 may be passed through sensing stations 16 and/or 17. The station 16 is coupled to a sensing device 18 that transmits data to a control station 19. The control station 19 is also coupled to a graphic read-out device 21. The sensing station 17 is coupled to a counting and indicating station 22. Although the operation of the test apparatus and the elements previously noted will be described in more detail, generally the test apparatus is adapted to pass a test fluid through a filter contained within the test housing 13 and the sensing devices 16 and 17 to provide respectively a continuous count of the number of particles in the test fluid and the respective sizes of the particles.

Considering the apparatus now in more detail, the reservoir 11 is comprised of a cylindrical stand pipe 23 that is open at its upper end and which is sealingly engaged at its lower end with a coupling 24 having a converging throat 25 which forms a fluid inlet to the pump 12. The pump 12 is designed in such a manner that, even though it circulates a fluid containing abrasive particle, it will not introduce any foreign particles through wear to the test fluid. The pump 12 is comprised of a fixed sleeve 26 having a flange 27 at its upper end that is held in place between the coupling 24 and a flange 28 formed at one end of a cylindrical pump housing 29.

The sleeve 26 is formed with a spiral like grooved passage 31 in which a complementary impeller or pumping member 32 is supported. The impeller 32 is fixed to one end of a drive shaft 33 that extends vertically upwardly through the reservoir 11 and which is affixed at its upper end to an electrically operated drive motor 34 by means of a coupling 35. Rotation of the drive shaft 33 and impeller 32 causes fluid to be driven from the reservoir 11 through the throat 25 and discharged under pressure through a discharge opening 36 formed in a lower flange in the pump housing 29. The reservoir 11 and pump 12 are supported upon a pedestal 37 that is adjustably supported upon a stand member 38 by means of a clamp 39.

A fluid conduit 40 transmits the pressurized test fluid from the pump 12 to an inlet passage 41 of a fluid flow meter, indicated generally by the reference numeral 42. The flow meter 42 is supported upon a pedestal 43 that is also adjustably carried by the stand member 38 by means of a clamp 44. The flow meter 42 may be of any known type.

The filter test housing 13 is comprised of a generally cylindrical shell 45 that defines a cylindrical filter test cavity 46. The shell 45 is affixed to an upwardly diverging housing section 47 that defines a conical section 48 of a fluid inlet passage. The upper end of the section 48 is of slightly larger diameter than the adjacent end of the filter test cavity 46 and defines a substantially smooth continuous wall with this cavity. An inlet fitting 49 is affixed at its upper end to the lower end of the housing section 47, as by bolts or the like 51. The inlet fitting 49 is also formed with a conical section 52 of the fluid inlet passage for the filter test housing 13. The larger diameter end of the section 52 is slightly larger than the smaller diameter end of the section 48, but these sections form a substantially continuous, relatively smooth wall flow section. The construction thus described insures that foreign particles entrained in the test fluid cannot settle out within the sections 48 and 52 or within the filter test cavity 46. Said another way, any foreign particle that so tends to separate from the fluid will be redirected into the stream of flow of the test fluid by the funnel shape of the inlet sections 48 and 52.

A test head, indicated by the reference numeral 53, is fixed to and closes the upper end of the housing 45 by means of bolts or the like 54. The test head 53 accommodates a first fluid outlet fitting 55 that is adapted to register with the fluid outlet side of the filter being tested. In addition, a by-pass outlet fitting 56 is accommodated by the test head which registers with an outlet passage 57 formed in the test head 53 and communicating directly with the filter test cavity 46. As in my aforementioned copending application, the filter test housing 13 is constructed in such a way that a wide variety of types of filters may be tested. Reference may be had to that application, which is incorporated herein by way of reference, as to how this versatility is achieved.

A conduit 58 in which a valve 59 is positioned extends fromt he outlet fitting 55 and a like conduit 60 in which a valve 61 is provided extends from the by-pass outlet fitting 56. The conduits 58 and 60 join at a conduit 62 from which branch conduits 63 and 64 extend to the cleanup filters 14 and 15, respectively. Valves 65 and 66 are positioned in the conduit 63 and 64, respectively, to control the flow through these conduits. Conduits 67 and 68 extend from the clean-up filters 14 and 15, respectively, back to the upper end of the reservoir 11. A conduit 69 also extends from the conduit 62 to an inlet fitting 71 of the sensing station 16. The inlet fitting 71 splits the flow from the conduit 69 so that a portion of this flow passes through the sensing station 16 and its associated sensing device 18 and is returned to the reservoir 11 through a return conduit 72. The remaining portion of the flow from the conduit 69 passes through a conduit 73 to a spill block 74. The spill block 74 delivers a portion of the fluid it receives to the sensing station 17 through a conduit 75 and returns the remainder of the flow to the reservoir 11 via a conduit 76.

The sensing station 16 and its associated sensing device 18 is of a type that visually scans the fluid by passing it between two opposed beams of light. As a particle passes between these beams, the light is scattered and is converted into an electrical signal by the device 18 which is electrically coupled, as schematically indicated at 77 and 78 to the control station 19 wherein a signal is indicated on its dial 81 that is representative of the magnitude or ratio of foreign particles in the test fluid. In addition, the control station 19 is electrically coupled as indicated schematically at 82 and 83 to the graphic read-out device 21 to provide a continuous reading or graph on a tape 84.

The sensing station 17 and its associated particle counter 22 counts the number of particles in the fluid, sizes the particles and tallies the number of particles in given size ranges. This unit operates by passing a light beam of an exact size through the fluid and onto a multiplier phototube. Each foreign particle in the fluid stream interrupts a portion of the light beam in proportion to its size and causes a pulse in the phototube output signal that is proportionate to the size of the particle. In the depicted embodiment, the number of particles in five different size groups are indicated on respective counters 85, 86, 87, 88 and 89. After the particles have been counted they are delivered from the sensing station 17 to a breaker 91 by means of a conduit 92.

The disclosed apparatus is particularly adapted for testing filter life during test conditions that closely approximate those encountered in actual use. For this purpose, a preselected quantity of foreign particles are added to the reservoir 11 at predetermined time intervals during the test sequence by a contaminant blender and automatic feed device comprised of a blender reservoir 95, pump 96 and contaminant feed head 97. The reservoir 95 is comprised of a vertically extending generally cylindrical stand pipe 98 which is open at its upper end with the pump 96 being supported at its lower end. The pump 96, like the pump 12, is designed to circuate a fluid containing relatively high abrasive particles without introducing additional particles through wear. The pump 96 is comprised of a sleeve 99 having a groove passage 101 in which a complementary impeller 102 is rotated by means of a drive shaft 103. The drive shaft 103 is coupled to an electric motor or the like 104 by a coupling 105 and is operated continuously during the test cycle for a reason which will become more apparent as this description proceeds. The pump 96 discharges through a conduit 106 which leads to a junction block 107. The junction block 107 is designed with intersecting passages 108 and 109. The conduit 106 enters into the pasage 108 at one end and a pressure indicating gauge 111 is connected to the opposite end of the passage 108. The passage 109 terminates at one end in a return conduit 112 in which a back pressure valve 113 is interposed. The conduit 112 discharges into the reservoir 95. The opposite end of the passage 109 is connected to a conduit 114 in which a valve 115 is positioned. By appropriately setting the valves 115 and 113, a preselected quantity of the contaminant which is comprised of foreign particles and a test fluid or the like, may be constantly recirculated back to the contaminant blender reservoir 95 through the passages 108 and 109 including the back pressure valve 113. The remaining portion of the flow is delivered by the conduit 114 to the contaminant feed head 97.

The contaminant feed head 97 (FIGURES 2 and 3) consists of a meter block 116 that is formed with a generally cylindrical metering cell or bore 117 which opens through the upper and lower ends of the block 97. The lower end of the cell 117 is closed by means of a member 118 which defines a valve seat 119 around a discharge passage 121. The opposite end of the cell 117 is closed by a cover plate 122 that is affixed to the meter block 116 in any suitable manner, as by bolts 123, and which is formed with a cylindrical bore 124 for supporting a valve rod 125. The valve rod 125 has a semispherical lower end 126 which is adapted to contact the valve seat 119 when the valve rod 125 is in its lowermost position as indicated by the dotted line view of FIGURE 3.

A return or outlet chamber 127 is formed in the meter block 116 parallel to the metering cell 117. Between the metering cell 117 and return chamber 127, the meter block defines a knife edge dividing wall 128. At the lower end of the return chamber 127, a fitting 129 is connected, which fitting forms a portion of a conduit 131 which leads back to the contaminant blender reservoir 95.

The end of the conduit 114 terminates in a flexible fill tube 132 that is juxtaposed to the upper ends of the metering cell 117 and return chamber 127. The end of the tube 132 is received in a bracket 133 which is fixed to a shaft 134 that is, in turn, pivotally supported by the cover plate 122. A pair of electrical solenoids 135 and 136 carried on opposite sides of the meter block 116 have armatures 137 and 138, respectively, which are bifurcated at their upper ends with pins 139 and 141 being affixed to these bifurcated ends. Levers 142 and 143 have slotted ends 144 (FIGURE 5) in which the respective pins 139 and 141 are received. The opposite ends of the levers 142 and 143 are affixed to the shaft 134 so that axial movement of the armatures 137 and 138 is transmitted into pivotal movement of the shaft 134. Coil springs 145 and 146 encircle the armatures 137 and 138, respectively, and normally urge these armatures to their uppermost position wherein the flexible fill tube 132 is disposed in registry with the return chamber 127 as shown in the solid line views of FIGURES 2 and 5. Upon simultaneous actuation of the solenoids 135 and 136, the fill tube 132 is moved to the dotted line position shown in these figures wherein its discharge will pass into the metering cell 117.

A second pair of solenoids 151 and 152 are also mounted on the metering block 116 and have respective armatures 153 and 154 that are connected by pins 155 and 156, respectively, to an actuating bar 157 that spans the metering block 116 and passes through a complementary shaped opening 158 formed in the valve rod 125. Coil springs 159 and 161 engage the armatures 153 and 154 to normally urge these armatures to an upward position wherein the valve 128 will be displaced from the seat 119 as shown in the solid line view of FIGURE 3.

A switch 162 having a contact arm 163 is mounted upon the meter block 116 and extends across the top of the bar 157 so as to be actauted by that bar when the bar is in its uppermost position. A switch actuator 164 is affixed to a threaded end of the valve rod 128, as by nuts 165 and 166. The switch actuator 164 is adapted to trip the switch 162 when the valve rod 125 is in its lowermost position.

Operation and test procedure

As has been noted, many types of fluid filters may be tested by the disclosed apparatus and, by way of example, a throw-away type automotive oil filter 171 (FIGURE 2) is positioned in the cylindrical filter test cavity 46. As is well known with this type of filter, it is formed with a discharge opening which is threaded onto a threaded extension 172 of the outlet fitting 55 so as to be in fluid registry with this fitting. A plurality of inlet openings (not shown) are disposed around the outlet fitting and are in fluid communication with a passage 173 formed in the test head 53, which passage is open to the filter test cavity 46 so that fluid under pressure in this cavity will be passed through the filter 171 and discharged from the fitting 55.

A test fluid of any known type normally used for testing fiters is charged into the system with the reservoir 11 being substantially filled. The valve 59 is closed, the valve 61 is opened and one or both of the valves 65 and 66 are opened. The pump 12 is operated by driving the electric motor 34 that is connected to a suitable source of electrical current in any known manner. This causes the test fluid to be circulated from the reservoir 11 through the conduit 40 into the filter test cavity 46. Since the valve 59 is closed all of the fluid flow will pass through the by-pass outlet passage 57 and by-pass outlet fitting 56, and there will be no flow through the filter 171. A portion of this fluid is delivered by the conduits 60, 62, 63 and 64 to the clean-up filters 14 and 15. These filters may be of any known type that are capable of removing substantially all particles from the test fluid. For this reason, the filter 15 may be a membrane filter, which filter is capable of excluding extremely small particles from a fluid. The filtered fluid is returned to the reservoir 11 by the conduits 67 and 68. A portion of the fluid also flows from the conduit 62 to the sensing station 16 via the conduit 69. The sensing station 16 and its associated sensing device 18 transmit a signal to the control station 19 and read-out device 21 to indicate that particles are being removed from the test fluid, if any particles were in fact previously present. In addition, the sensing station 17 receives fluid via the conduit 73 so that the particle counter 22 will also give a reading of the number and size of particles in the fluid. This operation is continued until the respective sensing units 16 and 17 indicate that substantially no foreign particles are present in the test fluid, or until the level of contamination of the test fluid in the system is below a given base line value.

The clean-up filters 14 and 15 are incapable of removing all particles from the test fluid. They will, however, remove all particles of a size large enough to be sensed by the sensing station 17 and recorded by the indicating station 22. There may, however by a certain number of particles smaller than this size present in the test fluid, which particles will be counted by the sensing device 16. In order to insure the uniform base line so that accurate comparisons may be made between different filters, the level of contaminants in the test fluid is subsequently raised in the manner now to be described. The valves 65 and 66 are closed while the by-pass valve 62 remains open. Continued opeartion of the pump 12 will cause circulation of the test fluid from the reservoir 11 through the filter test housing 13, sensing stations 16 and 17 and back to the reservoir 11. Oil with an additive is then added to the reservoir 11 on a drop-by-drop basis. The additives in the oil will be sensed as particles by the sensing device 16 and sufficient drops are added to bring the particle count up to the desired base line. For example, ten particles may be considered to be base line. The sensing station 17 will not count the additive drops as particles due to its design. Hence, the addition of the aditive containing oil to the test fluid will not compromise the operation of the sensing station 17 and its associated indicating station 22.

After the base line condition has been reached, foreign particles are added to the test fluid, the number and type of particles being determined by the test to be run. In one standard test, a slurry consisting of A.C. Fine Dust wetted with oleic acid is added to the reservoir 11 until the strip chart 84 indicates a desired contaminant level. The A.C. Fine Dust is a test contaminant that is made up of a mixture of particles of different sizes. Circulation of the test fluid containing this contaminant is continued so that the operator can assure himself that the contaminants have been equally distributed throughout the test fluid and that the contaminant level is constant.

During this time the blender reservoir 95 is filled with a mixture of the foreign particles and test fluid but the mixture charged into the reservoir 95 has a substantially higher concentration of foreign particles than that charged into the reservoir 11. The pump 96 is operated and the valves 113 and 115 appropriately positioned so as to cause the desired amount of flow through the conduit 114 to the flexible fill tube portion 132. Since this portion normally registers with the return cavity 127, the contaminant bearing fluid will merely be recirculated in the contaminant feed system. This recirculation, however, insures uniform mixture of the foreign particles with the test fluid within the feed system.

To initiate the test cycle, the test fluid and entrained foreign particles are passed through the filter to be tested 171 by opening the valve 59. A uniform flow rate through the filter 171 is maintained either during the initial test procedure or for the full test period. The sensing stations 16 and 17 indicate the contaminant level instantaneously during the test period. A small amount of test fluid is drawn off from the sensing station 17 through the conduit 92 into the beaker 91. Initially the graphic read-out device 21 may be driven at a relatively rapid rate, for example, at a rate wherein the strip chart 84 passes by the recording pen at about ¾ inch a minute with a subsequent slowing if desired. The strip chart 84 and data recorded at various time intervals from the counters 85, 86, 87, 88 and 89 then indicate the efficiency of the filter 171 as well as the efficiency in removing particles of varying sizes.

In order to approximate with the test procedure conditions encountered in actual use, additional foreign particles are periodically added to the reservoir 11 by the manner now to be described. At preselected time intervals the solenoids 135 and 136 are actuated against the bias of the springs 145 and 146. This actuation will cause the flexible fill tube 132 to move into registry with the metering cell 117 as shown in the dotted line views of FIGURES 2 and 5. The fill tube 132 is held in this position for sufficient time for the metering cell 117 to fill with fluid. Any excess fluid will pass over the knife edge 128 back into the return cavity 127 for return to the contaminant blender reservoir 95 through the conduit 131. After the metering cell 117 has been filled, the solenoids 135 and 136 are deactuated and the fill tube 132 returns to registry with the return cavity 127. At this time, the solenoids 151 and 152 are actuated to raise the valve rod 125 so that its valve portion 126 is free from the valve seat 119. A quantity of contaminants determined by the valve seat 119. A quantity of contaminants determined by the volume of the cell 117 will then be discharged through a conduit 181 to the reservoir 11. This cycle may be repeated at desired time intervals so that additional foreign particles are added to the test fluid flowing through the filter 171 on a continuous basis. The sensing stations 16 and 17 will, therefore, indicate the efficiency of the filter under actual conditions. The expected life of the filter may also be accurately determined by this procedure. Alternatively, the life of the filter 171 in actual use may be determined by continuing the test sequence as described above until its resistance to flow exceeds a predetermined value or until its pressure relief valve opens.

It is to be understood that various changes may be made in the test procedure from those described above utilizing the disclosed apparatus. The apparatus may, of course, be operated on the same test procedure as that disclosed in my aforenoted copending application. Various other changes and modifications may be made without departing from the spirit and scope of the invention.

What is claimed is:

1. The method of testing a fluid filter comprising the steps of continuously passing a test fluid containing foreign particles through a filter to be tested, periodically determining the amount of foreign particles removed from the test fluid by the filter, continuing the recirculation of the test fluid and entrained foreign particles through the filter for a given time period, and adding predetermined quantities of foreign particles to the test fluid at predetermined times during the test cycle while continuing the determination of the number of foreign particles removed by the test filter.

2. The method as set forth in claim 1 further including the step of determining the size of foreign particles removed from the test fluid by the filter.

3. The method as set forth in claim 1 further including the step of continuously circulating a mixture of test fluid and foreign particles having a higher density of foreign particles than that passed through the filter, the addition of predetermined quantities of foreign particles to the test fluid being taken from the continuously circulating mixture.

4. In an apparatus for testing fluid filters or the like including a reservoir for containing a test fluid and foreign particles, means for continuously circulating the test fluid and entrained foreign particles through a filter to be tested and sensing means for determining the number of foreign particles present in the test fluid to determine the number of such particles removed by the filter, the improvement comprising means for selectively adding a predetermined amount of foreign particles to said reservoir at predetermined time intervals.

5. An apparatus as set forth in claim 4 wherein the means for selectively adding a predetermined amount of foreign particles to the reservoir comprises a contaminant reservoir adapted to contain a mixture of test fluid and foreign particles having a greater density of foreign particles than that contained in the first mentioned reservoir and means for selectively adding predetermined amounts of said mixture to the first mentioned reservoir.

6. An apparatus as set forth in claim 5 further including means for continuously circulating the mixture in the contaminant reservoir between said contaminant reservoir and a metering head for precluding the settling out of foreign particles in said contaminant reservoir, said metering head being effective to add a predetermined amount of said mixture to the first mentioned reservoir.

7. An apparatus for periodically adding a predetermined amount of a test fluid and entrained foreign particles to a filter test apparatus comprising a meter block defining a metering cell and an outlet chamber, valve means for controlling the discharge of fluid from said metering cell, nozzle means, means supporting said nozzle means for movement between a first position wherein said nozzle means registers with said return chamber and a second position wherein said nozzle means registers with said metering cell for filling said metering cell, and means for sequentially moving said nozzle means between its first and second positions and for operating said valve means to drain said metering cell.

References Cited

UNITED STATES PATENTS

| | | |
|---|---|---|
| 3,093,998 | 6/1963 | Albertson et al. |
| 3,275,834 | 9/1966 | Stevens. |

OTHER REFERENCES

Gordon, E. S., et al., Electronic Instrumentation of a Device to Automatically Count and Size Particles in a Gas, in I.R.E. Transactions on Industrial Electronics, pp. 12–22, March 1956.

LOUIS R. PRINCE, Primary Examiner

JOSEPH W. ROSKOS, Assistant Examiner

U.S. Cl. X.R.

73—38